United States Patent
Robertson et al.

(10) Patent No.: US 11,843,988 B2
(45) Date of Patent: Dec. 12, 2023

(54) SYSTEM AND METHOD FOR DETECTING PRESENCE WITHIN A STRICTLY DEFINED WIRELESS ZONE

(71) Applicant: Simpello LLC, Monticello, IN (US)

(72) Inventors: William Benjamin Robertson, Monticello, IN (US); Roger Mabillard, St-Hyacinthe (CA); Jean-Samuel Chenard, Saint-Bruno (CA); Xavier Bernard, St-Mathias sur Richelieu (CA); Craig A. Stoller, Paulding, OH (US)

(73) Assignee: Simpello LLC, Monticello, IN (US)

( * ) Notice: Subject to any disclaimer, the term of this patent is extended or adjusted under 35 U.S.C. 154(b) by 0 days.

(21) Appl. No.: 16/948,416

(22) Filed: Sep. 17, 2020

(65) Prior Publication Data

US 2020/0413216 A1   Dec. 31, 2020

Related U.S. Application Data

(63) Continuation of application No. PCT/US2019/022915, filed on Mar. 19, 2019.
(Continued)

(51) Int. Cl.
*H04W 4/021* (2018.01)
*G06Q 20/32* (2012.01)
(Continued)

(52) U.S. Cl.
CPC ........ *H04W 4/021* (2013.01); *G06Q 20/3224* (2013.01); *G07C 9/00309* (2013.01);
(Continued)

(58) Field of Classification Search
CPC .............. H04W 4/021; G06Q 20/3224; G06Q 30/0226; H01Q 13/203; H01Q 25/00; H04B 5/0018
See application file for complete search history.

(56) References Cited

U.S. PATENT DOCUMENTS

| 4,401,260 A | 8/1983 | Grant |
| 4,868,914 A | 9/1989 | Yamashita |

(Continued)

FOREIGN PATENT DOCUMENTS

| EP | 1965595 A1 | 9/2008 |
| JP | 08184236 A | 7/1996 |

(Continued)

OTHER PUBLICATIONS

Written Opinion and Search Report from PCT application No. PCT/US2019/022915 dated Jun. 14, 2019.
(Continued)

*Primary Examiner* — Vernal U Brown
(74) *Attorney, Agent, or Firm* — Woodard, Emhardt, Henry, Reeves & Wagner, LLP

(57) ABSTRACT

A wireless proximity detection system employs short-range wireless communication to detect the proximity of a user device within a strictly defined wireless zone and as a result trigger a desired action. The proximity detection system may utilize one or more leaky feeders to define the wireless zone and the associated received signal strength(s) detected by the user's wireless device. Alternatively, a compact planar antenna structure coupled with a highly shielded radio transceiver is used to allow a similar precise low-power radio beam to be emitted defining a small location to enable identification of a wireless device such as a smartphone in a given area in front of the device. The planar antenna structure allows a compact and low-cost fabrication method and the use of common printed circuit fabrication methods provide an integrated solution.

4 Claims, 8 Drawing Sheets

Related U.S. Application Data

(60) Provisional application No. 62/789,665, filed on Jan. 8, 2019, provisional application No. 62/644,844, filed on Mar. 19, 2018.

(51) Int. Cl.
  G07C 9/00 (2020.01)
  H01Q 13/20 (2006.01)
  H01Q 25/00 (2006.01)
  G06Q 20/20 (2012.01)
  G06Q 30/0226 (2023.01)

(52) U.S. Cl.
  CPC .......... H01Q 13/203 (2013.01); H01Q 25/00 (2013.01); *G06Q 20/20* (2013.01); *G06Q 30/0226* (2013.01)

(56) References Cited

U.S. PATENT DOCUMENTS

| | | |
|---|---|---|
| 5,014,050 A | 5/1991 | Lewiner et al. |
| 5,337,588 A | 8/1994 | Chhatwal |
| 5,614,703 A | 3/1997 | Martin et al. |
| 5,898,904 A | 4/1999 | Wang |
| 5,990,885 A | 11/1999 | Gopinath |
| 6,553,238 B1 | 4/2003 | Ginzel et al. |
| 6,674,403 B2 | 1/2004 | Gray et al. |
| 6,772,331 B1 | 8/2004 | Hind et al. |
| 6,900,603 B1 | 5/2005 | Del Vecchio |
| 7,012,503 B2 | 3/2006 | Nielsen |
| 7,039,435 B2 | 5/2006 | McDowell et al. |
| 7,114,178 B2 | 9/2006 | Dent et al. |
| 7,119,744 B2 | 10/2006 | Theobold et al. |
| 7,315,823 B2 | 1/2008 | Brondrup |
| 7,315,824 B2 | 1/2008 | Chen et al. |
| 7,403,743 B2 | 7/2008 | Welch |
| 7,446,644 B2 | 11/2008 | Schaffzin et al. |
| 7,565,411 B1 | 7/2009 | Turcotte |
| 7,769,394 B1 | 8/2010 | Zhu |
| 7,953,392 B2 | 5/2011 | Karstens |
| 8,219,114 B2 | 7/2012 | Larsen |
| 8,344,953 B1 | 1/2013 | Gilbrech et al. |
| 8,428,550 B2 | 4/2013 | Larsen |
| 8,674,829 B2 | 3/2014 | Karam et al. |
| 8,880,434 B2 | 11/2014 | Bemmel et al. |
| 8,942,704 B1 | 1/2015 | Vivanco et al. |
| 9,033,225 B2 | 5/2015 | Hefetz |
| 9,666,000 B1 | 5/2017 | Schoenfelder et al. |
| 2002/0055879 A1 | 5/2002 | Wengrovitz et al. |
| 2002/0099945 A1 | 7/2002 | McLintock et al. |
| 2002/0183008 A1 | 12/2002 | Menard et al. |
| 2003/0023463 A1 | 1/2003 | Dombroski et al. |
| 2003/0064732 A1 | 4/2003 | McDowell et al. |
| 2003/0100315 A1* | 5/2003 | Rankin ............... H04M 3/487 |
| | | 455/456.3 |
| 2003/0118237 A1 | 6/2003 | Laird |
| 2003/0149576 A1 | 8/2003 | Sunyich |
| 2003/0167273 A1 | 9/2003 | Alexander et al. |
| 2003/0208386 A1 | 11/2003 | Brondrup |
| 2004/0032362 A1 | 2/2004 | Andersson et al. |
| 2004/0034537 A1 | 2/2004 | Gengarella et al. |
| 2004/0059815 A1 | 3/2004 | Buckingham et al. |
| 2004/0174247 A1 | 9/2004 | Rodenbeck et al. |
| 2004/0196182 A1 | 10/2004 | Unnold |
| 2005/0009511 A1 | 1/2005 | Bostrom et al. |
| 2005/0035190 A1 | 2/2005 | Nanbu et al. |
| 2005/0051620 A1 | 3/2005 | DiLuoffo et al. |
| 2005/0094610 A1 | 5/2005 | de Clerq et al. |
| 2005/0210283 A1 | 9/2005 | Kato |
| 2005/0241003 A1 | 10/2005 | Sweeney et al. |
| 2005/0261833 A1 | 11/2005 | Brosius et al. |
| 2006/0056353 A1 | 3/2006 | McBride |
| 2006/0106930 A1 | 5/2006 | Shaffer |
| 2006/0116127 A1 | 6/2006 | Wilhoite et al. |
| 2006/0147043 A1 | 7/2006 | Mann et al. |
| 2006/0152336 A1 | 7/2006 | Turkovich et al. |
| 2006/0154687 A1 | 7/2006 | McDowell et al. |
| 2006/0164205 A1 | 7/2006 | Buckingham |
| 2006/0183462 A1 | 8/2006 | Kolehmainen |
| 2006/0187034 A1 | 8/2006 | Styers et al. |
| 2006/0236363 A1 | 10/2006 | Heard et al. |
| 2006/0287016 A1 | 12/2006 | Portaro et al. |
| 2007/0094716 A1 | 4/2007 | Farino et al. |
| 2007/0176739 A1 | 8/2007 | Raheman |
| 2007/0176840 A1 | 8/2007 | Pristas |
| 2007/0188301 A1 | 8/2007 | Nakajima et al. |
| 2007/0265738 A1 | 11/2007 | Saito |
| 2007/0285233 A1 | 12/2007 | Inomata et al. |
| 2008/0137631 A1 | 6/2008 | de Clerq et al. |
| 2008/0176580 A1 | 7/2008 | Dery |
| 2008/0183480 A1 | 7/2008 | Carlson et al. |
| 2008/0191009 A1 | 8/2008 | Gressel et al. |
| 2008/0194226 A1 | 8/2008 | Rivas et al. |
| 2008/0209521 A1 | 8/2008 | Malaney |
| 2008/0214209 A1 | 9/2008 | Ratnakar |
| 2008/0221862 A1 | 9/2008 | Guo et al. |
| 2008/0252452 A1 | 10/2008 | Aizawa |
| 2008/0301580 A1 | 12/2008 | Hjelmeland Alams et al. |
| 2009/0066476 A1 | 3/2009 | Raheman |
| 2009/0093234 A1 | 4/2009 | Cai et al. |
| 2009/0119698 A1 | 5/2009 | Kuijlaars |
| 2009/0261965 A1 | 10/2009 | Cum |
| 2009/0289873 A1 | 11/2009 | Schilling et al. |
| 2009/0299777 A1 | 12/2009 | Silberman |
| 2009/0313046 A1 | 12/2009 | Badgett et al. |
| 2010/0057501 A1 | 3/2010 | Mohammed |
| 2010/0082491 A1 | 4/2010 | Rosenblatt et al. |
| 2010/0201482 A1 | 8/2010 | Robertson et al. |
| 2010/0226347 A1 | 9/2010 | Caldwell et al. |
| 2010/0283579 A1 | 11/2010 | Kraus et al. |
| 2011/0001827 A1 | 1/2011 | Ortiz et al. |
| 2011/0065391 A1 | 3/2011 | Shiotsuki |
| 2011/0102131 A1 | 5/2011 | de Clerq et al. |
| 2011/0173682 A1 | 7/2011 | Perry et al. |
| 2011/0230211 A1 | 9/2011 | Kim et al. |
| 2011/0234338 A1* | 9/2011 | Takahashi ............ H01Q 21/068 |
| | | 333/237 |
| 2012/0011365 A1* | 1/2012 | Schmidt ................ H04W 28/06 |
| | | 713/168 |
| 2012/0244885 A1 | 9/2012 | Hefetz |
| 2013/0166917 A1 | 6/2013 | Granbery |
| 2013/0178232 A1 | 7/2013 | Claussen et al. |
| 2013/0217376 A1* | 8/2013 | Behairy ................ H04L 67/303 |
| | | 455/418 |
| 2013/0297422 A1 | 11/2013 | Hunter et al. |
| 2014/0111334 A1 | 4/2014 | Carpenter et al. |
| 2014/0157838 A1 | 6/2014 | Nave |
| 2014/0340032 A1 | 11/2014 | Curtis |
| 2015/0009903 A1 | 1/2015 | Xue et al. |
| 2015/0091673 A1* | 4/2015 | Asplund ............... H01Q 13/203 |
| | | 333/237 |
| 2015/0151515 A1 | 6/2015 | Skepton |
| 2015/0172264 A1* | 6/2015 | Hardy ..................... H04W 4/80 |
| | | 726/4 |
| 2015/0324851 A1 | 11/2015 | Campbell et al. |
| 2015/0382436 A1 | 12/2015 | Kelly et al. |
| 2016/0055692 A1 | 2/2016 | Trani |
| 2016/0078264 A1* | 3/2016 | Armstrong ......... G06K 7/10475 |
| | | 340/572.1 |
| 2016/0173672 A1 | 6/2016 | Boyce |
| 2016/0210799 A1 | 7/2016 | Robertson et al. |
| 2016/0259061 A1 | 9/2016 | Hwang et al. |
| 2016/0300413 A1 | 10/2016 | Robertson et al. |
| 2016/0352001 A1* | 12/2016 | Cai ......................... H01Q 9/285 |
| 2017/0221289 A1 | 8/2017 | Trani |
| 2018/0063674 A1 | 3/2018 | Hershey et al. |
| 2018/0174076 A1 | 6/2018 | Fukami |
| 2018/0308303 A1 | 10/2018 | Esposito |
| 2018/0367209 A1* | 12/2018 | Jamaly ................. H04B 7/1555 |
| 2019/0122196 A1 | 4/2019 | Lauria et al. |

(56) References Cited

U.S. PATENT DOCUMENTS

2020/0006988 A1  1/2020  Leabman
2021/0256788 A1  8/2021  Eathakota et al.

FOREIGN PATENT DOCUMENTS

JP    2002013324 A    1/2002
JP    2003/138816 A   5/2003
KR    2006/0088613 A  8/2006
WO    WO 2019/183053 A1  9/2019

OTHER PUBLICATIONS

European Search Report from EP Application No. EP 19770336.6, dated 2021, 5 pages.
Search report and written opinion from PCT application No. PCT/US18/53347 dated Dec. 12, 2018 (11 pages).
Written Opinion and Search Report from PCT application PCT/US21/42724 dated Nov. 2, 2021, 10 pages.
Signature by VingCard—VingCard Elsafe—Assa Abloy—"VingCard Ouptpacing Industry in RFID/NFC Skill: Displays Electronic Lock Advancement for Remote Hotel Check-in/Check-out at IH/MRS" Paris Nov. 6, 2008—VingCard Elsafe s.a.s—37, rue Adam Ledoux—BP 46—92 404 Courbevoie Cedex France (4 pgs.).

\* cited by examiner

SYSTEM AND METHOD FOR DETECTING PRESENCE WITHIN A STRICTLY DEFINED WIRELESS ZONE

CROSS REFERENCE TO RELATED APPLICATIONS

This application is a continuation of International Patent Application No. PCT/US2019/022915, filed Mar. 19, 2019 which claims the benefit of U.S. Provisional Patent Application Ser. No. 62/644,844 filed on Mar. 19, 2018 entitled "System and Method for Detecting Presence within a Strictly Defined Wireless Zone" and U.S. Provisional Patent Application Ser. No. 62/789,665 filed on Jan. 8, 2019 entitled "Planar Antenna for Use in Detecting Presence within a Strictly Defined Wireless Zone", each of which is hereby incorporated by reference to the extent not inconsistent.

FIELD OF THE INVENTION

The present invention generally relates to a combination of a radio transceiver, a coaxial, planar or other antenna structure and antenna beam directivity manipulation for allowing a system to narrow down the position of a smartphone or other wireless device to a given radiation zone for the creation of an authentication of a transaction in only a limited and specific area.

BACKGROUND

Smartphone adoption in the United States has grown rapidly from less than 6% of the population in 2007 to nearly 80% of the population today. Currently, smartphones are being used for payment, GPS tracking, music streaming, access control, security and a wide range of other purposes unrelated to traditional telephony. Such widespread use by consumers, travelers and employees provides numerous opportunities for businesses, government and facilities to passively identify and/or interact with these devices and their user. However, very few uses have gone so far as to utilize smartphones (or other similar devices) to determine a user's presence within a strictly defined wireless zone by using purposely built antennas.

As one specific example, major hotel chains have invested tremendous assets in programs which allow them to better understand the needs of travelers and to make their stay as streamlined as possible. For instance, some hotels provide express check-in for a select set of their guests, while others provide check-in/check-out over the Internet or via a computer kiosk located in the hotel lobby. Others even allow the use of a smart phone as the hotel key. While these advances have certainly increased the occupancy rates of the various major hotel chains, they have not addressed the primary security issue, which is to ensure that the user's smart phone is located in a strictly defined zone outside the room where the user is clearly seeking to gain entry into his/her room. This is to the exclusion of the user's phone merely being adjacent to the room, such as while waiting for the elevator or while walking past their room.

Similarly, these issues can be found in numerous other situations. Thus, this disclosure is applicable in all areas where the detection of an identifiable customer, employee or other individual within a specific zone enables one or more desired or secured action(s), such as entrance or access to a structure, vehicle, venue, or any other type of restricted area, the adjustment of a desk, signage, or computer workstation to a user's preferences or for marketing purposes. In addition to these types of actions, smartphone utilization for payment and transactions has seen an important growth in acceptance and the use of near-field communication has traditionally been used to enable these types of transactions (e.g. tap to pay credit cards). For sales transactions, such as a coffee purchase or fast-food items, the use of the proximity of a smartphone to a vending machine or sales counter may be sufficient to authorize a sales transaction without needing the buyer to get their smartphone out of their pocket or add another layer of confirmation to the transaction, provided that the user is identified as being in close proximity of the vending machine or sales counter during the transaction which is vetted by electronic means like a token exchange. Alternatively, the near presence of a known wireless device may serve as a two factor authentication for a credit card transaction or the like. In another form, the presence of an authorized or expected wireless device may serve as an airline ticket, concert ticket or the like. The systems disclosed herein seeks to accomplish this type of transaction (hereinafter called "StrictID" or the "StrictID system"). In addition, other potential and non-limiting applications will be discussed herein.

DETAILED DESCRIPTION

Figure 1:
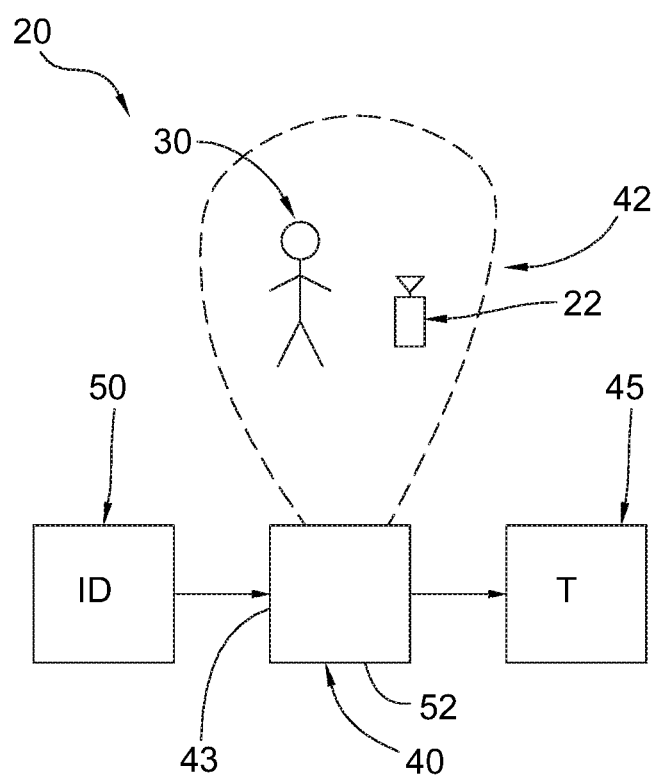
FIG. 1 is a diagrammatic view of one embodiment of a proximity detection system according to the present invention.

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Many systems exist which attempt to identify the presence of a user or wireless device within a large and loosely defined area. For example, Apple's iBeacon® technology is frequently utilized to detect a user's presence within a general wireless area and trigger advertisements, gather information from visitors to a store, and track the flow or workers within an office environment. However, all of this done using standard omni-directional antennas and thus the traditional transmission range of the device serves to define the area in which these actions take place. While this is suitable for triggering ads or other actions where greater granularity than a general proximity is not required, many useful and desirable actions simply cannot be taken as the zone cannot be sufficiently well defined. For example, the prior art systems are unable to define a wireless transmission zone so as to accurately detect the specific user at the front of a line, a user seated at a selected desk, a user standing in front of a kiosk or vending machine, or the like. The prior art systems would recognize one or more other users who were also present in or around the intended area and thus the system would be ineffectual for such an application. The prior art will also leverage the use of multiple beacons and power levels among a group of beacons as means to approximate location of users. The various attenuation effects of the body, antenna polarization make those methods accurate only to a few meters and the installation, setup and parametrization of the system is complex.

Many radio systems nowadays, including cellular and smartphone radios, integrate processing capabilities and can support very popular protocols like Bluetooth Low Energy which is a very common standard supported by almost all smartphone devices. Most of those radio systems are built around a System-on-chip radio that incorporates a central processing unit and an advanced radio transceiver in a very low-cost and integrated package. Conventional usage of these integrated circuits combines the system-on-chip transceiver with a ceramic antenna or a printed monopole or dipole antenna. The general objective is to maximize the antenna matching to maximize the range and consequently the achievable distances. The Bluetooth Radio Subsystem typically emit power levels varying from +4 dBm to −30 dBm under software control resulting in distances varying from a few meters to 100 meters or more. Using standard antennas for this purpose makes it difficult to know if a user is in front of the device as most of the common antenna topologies provide an omnidirectional radiation pattern. Even setting the lowest radio power output, common antennas structures will create a connectivity bubble around the unit that show no directivity properties.

To provide for this improved level of granularity in defining a wireless zone, and to avoid the detection of multiple users when only one is intended, an embodiment of the present invention may utilize one or more leaky feeder antennas. A leaky feeder is particularly useful in the present application as, despite their intended purpose for distributing RF absent directionality along a lengthy run, such as in a mineshaft or an aircraft compartment, it has been discovered that they may be modified for an alternative use in creating highly confined and restricted radiation patterns of varying sizes which enable the creation of a small tailored zone, such as a strictly defined wireless zone. In this application, contrary to the conventional long-run usage of a leaky feeder, there is typically no need for a line amplifier as the amount of signal leakage over the relatively short length is minimal. The structure also allows daisy chaining of those antennas as most of the power is maintained in the antenna and terminated.

At a broad level, the novel proximity detection system described herein attempts to overcome this omnidirectional antenna structure and permit the detection of a user's entrance into a strictly defined wireless zone using a wireless device and have one or more desirable actions automatically taken on the user's behalf as a result. In addition to the workplace and transactional embodiments described herein, it will be appreciated that similar embodiments of the proximity detection system to be described may also encompass systems application in the lodging and/or retail space as well as for triggering/controlling other desired actions in other fields and that the system is not limited to the various exemplary applications described herein.

Illustrated in FIG. 1 is a generic implementation of the StrictID system comprised of one or many connected devices that include a radio subsystem 20 capable of communicating with the wireless user device 22, such as a smartphone of user 30 when the user 30 enters a radio zone 42 created by an antenna 40 which has directivity properties.

The invention addresses at least two core objectives to provide a more strictly defined area of radio energy concentration:

A) The first objective is to radiate power to a level which is near the sensitivity threshold of most cell phone Bluetooth Low Energy receivers (typically in the −90 dBm to −100 dBm range). Some examples of Bluetooth Low Energy transceivers are the nRF52832 from Nordic Semiconductor, but any other transceivers can be used in this invention provided that they are operating in the same frequency band tuning of the antenna structure (noting that the leaky feeder structures are inherently wideband and minor changes to the slots can re-calibrate the radiation patterns for other frequencies like 900 MHz or 5 GHz) and that they are matched to the characteristic impedance of the structure. The antenna slot structure and pattern is set such that at around 1 meter of distance, the received signal strength is in the order of −90 dBm. Software algorithms may further manipulate the thresholds to adjust each chipset and compensate for the last few dBm of sensitivity variance in cell phone chipsets variations of technology Furthermore, the integration of common Bluetooth radios require no complex manipulation or attenuation of the transmitted power as the inherent low antenna efficiency of the leaky feeder ensures that only a small portion of the inbound signal is emitted at the antenna openings. As such, most of the power continues in the antenna structure allowing the daisy chaining of antennas as in FIG. 9.

Figure 2A:
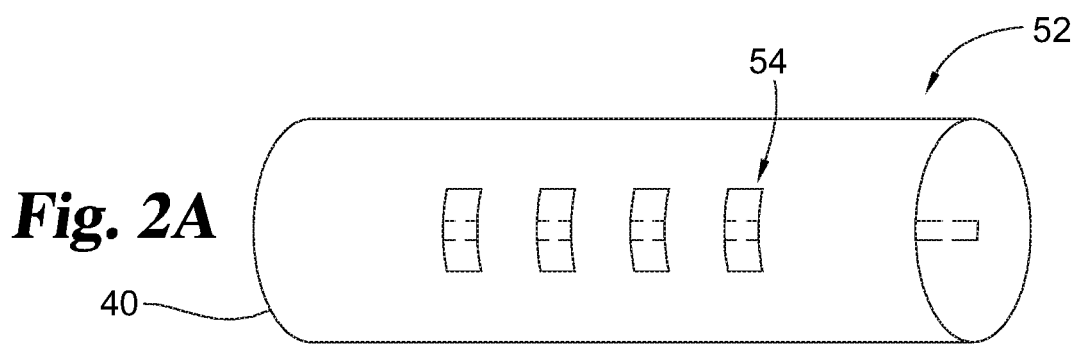
FIG. 2A is a design view showing slot patterns that allow the manipulation and enhancement of the directivity and control of the radiation efficiency of the antenna of FIG. 1.
Figure 2B:
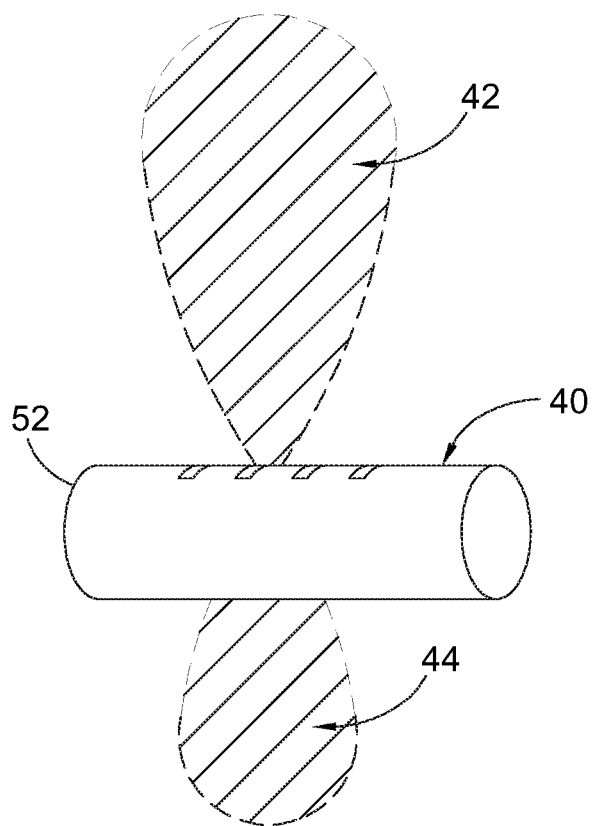
FIG. 2B is a top down view antenna pattern (hatched zone) of the leaky feeder antenna of FIG. 1 showing the presence of a back lobe.

B) The second objective is to create a compact antenna that will focus the energy in a desired narrow beam in front of the identification device. One approach used to leverage the ability to control slot patterns 52 in a leaky feeder type antenna 52 to create lobe patterns that enhance the directivity of the antenna as shown in FIG. 2A. The antenna pattern for a 4-slot leaky feeder antenna 52 viewed from above is illustrated in FIG. 2B. As can be seen, this antenna design produces a single radiation lobe that has strong forward lobe 42 and a less substantial back lobe 44 radiation pattern (a relatively good front-to-back ratio in antenna terminology).

The rationale to create a very weak radio zone rather than rely on strong beam directivity is that in most environments, metallic structures (concrete reinforcements, support beams, metallic fire door) will redirect (bounce) enough energy between the user's smartphone 22 and the radio system 50 such as to create connection link that can end up in different locations than the required area. A radio signal loses quite a bit of strength if it bounces off a metallic structure and thus starting with a very low signal emitted from the antenna will significantly reduce or eliminate the odds of creating out-of-zone persistent connections.

In some variants of the system, the antenna structure comprising of the feed port 43, the leaky feeder antenna 52 and a termination 45 matching the characteristic impedance of the structure is structured to create a precise beam of low radio power illuminating an area of interest 42 for detection of users 30 and their smartphones 22.

It is important to emphasize that the antenna structure is constructed to be of low radiation efficiency allowing typical radio transceivers to be used with their common output power levels varying between −20 dBm and +4 dBm directly feeding into the antenna structure. Most of the energy will end up dissipated at the end of the leady feeder antenna in the termination 45. The radiated power is very low due to the low radiation efficiency of the structure, but allow scalable systems to be constructed out of the same line as most of the RF wave power remains until the termination.

The overall radio circuit 50 needs to be strongly shielded for proper operation of the system. The StrictID system may include a full cage shield over the radio components and the PCB layout will include strong shielding precautions as to avoid any leakage of RF signal from the radio circuit to its surrounding environment. The intended low level of emissions is only to be at the antenna radiation slots 54.

In the form illustrated, antenna 40 is in the form of a leaky feeder 52. Leaky feeder 52 is an adaptation of a standard round coaxial cable where the outer conductor intentionally includes one or more gaps or slots or cut holes (collectively "gaps") 54 which allow the structure to radiate in a controlled manner. Electromagnetic waves propagate through the dielectric within the cable, with currents running along the inner and outer conductors. These waves can "leak" through the gaps 54 in the outer conductor. This makes this structure act like a slotted waveguide antenna, since the coaxial feeder cable can be seen as a particular type of waveguide. In a normal coaxial cable this is, of course, unintended behavior, however this is what allows the leaky feeder 52 to act as an antenna. In one form, leaky feeder 52 is less than 5 feet in length. In a further form, leaky feeder 52 is less than 2.5 feet in length. In a still further form, leaky feeder 52 is less than 1 foot in length. In yet another form, leaky feeder 52 is less than 4 inches in length.

The construction of the leaky feeder 52 can be done with common coaxial cables structures with solid shields for ease of machining. Typical examples of such coaxial cables that were used include Heliax 0.5 inch 50 ohm that were machined on the corrugations in a process similar to the manufacturing of leaky feeder coaxial cables used in underground mines for radio propagation over long distances in tunnels. Smaller diameter antennas were also machined from RG401/U coaxial cable which has a solid and smooth shield which was easier to machine precisely. Finally, a structure similar to coaxial cable can be emulated using PCB material and conductive layers for very compact 'leaky antennas'.

Figure 3:
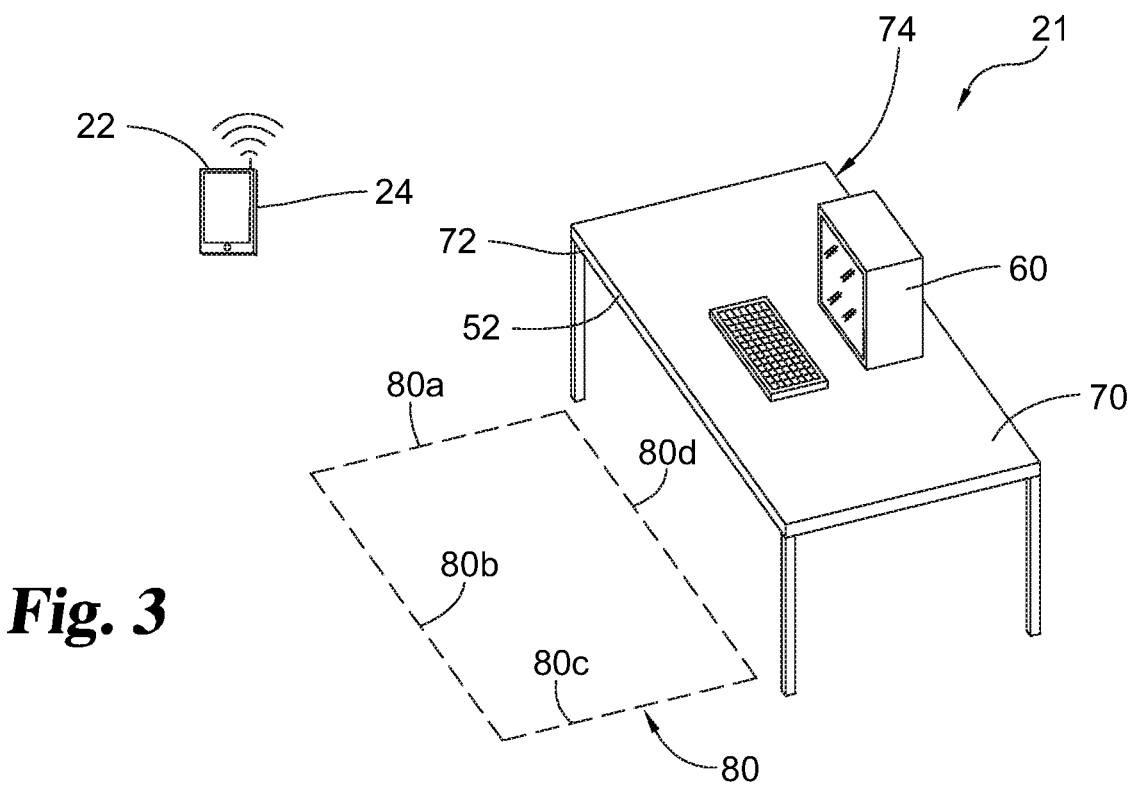
FIG. 3 is a diagrammatic view of a proximity detection system according to a specific application of an embodiment of a proximity detection system according to the present invention.

In another embodiment, according to FIG. 3, one specific application of a proximity detection system 21 is shown which enables a user (such as an employee) using his/her wireless device 22 to have one or more desirable actions taken on the user's behalf, such as automatically logging the user into a computer workstation 60 (or have one or more steps thereto performed), adjusting the height of desk 70 and/or automatically performing one or more other desirable actions by simply entering a strictly defined wireless zone 80. In the preferred form, the employee's wireless device 22 is a Bluetooth® capable phone 24 or other wireless token or appliance. In other forms, the wireless device 22 is an electronic device capable of short range wireless communication, such as a device implementing Bluetooth®, Zigbee® or some other low-power wireless communication protocol/standard. In an alternate form, the user's wireless device 22 may be in the form of a dedicated wireless token. In one form, the user's wireless device 22 may include an installed application or other installable and/or dedicated software or circuitry which enables it to be detected (or discoverable) by the remainder of proximity detection system 21 as is known in the art.

In the illustrated embodiment, computer workstation 60 and desk 70 collectively form an area for an employee to sit and work, such as is common in an open office or flexible office layout. In this form, the computer workstation 60 and desk 70 are not typically assigned to a selected user, but rather are available for use by anyone on a first come first serve basis. Workstation 60 rests on desktop or desk 70, which is shown in the illustrated embodiment as being a traditional rectangular shape, having both a front 72 and back 74. Desk 70 also includes a motorized height adjustment mechanism (not shown), as is known in the art, such as that available from Steelcase Inc. in its Series 3, Series 5 and Series 7 height-adjustable desks. Computer workstation 60 may be a traditional desktop computer, a thin client, a laptop computer, a telephone terminal, a cash register or any other type of computing device known in the art. Desk 70 may also include a chair (not shown), such as for use by a user utilizing computer workstation 60 and/or desk 70.

Defined in proximity of the desk 70, in the area where a worker or employee would sit or stand to utilize computer workstation 60, is a strictly defined wireless zone 80 which is bounded by logical boundaries 80a, 80b, 80c and 80d. Wireless zone 80 is defined by the radiation patterns of leaky feeder antenna 52 which is mounted on, integrated in or otherwise located adjacent to wireless zone 80. Physically, the radiation pattern of the leaky feeder antenna 52 does not look like a square and will go over logical boundaries 80b and 80*d* but, by the means of software algorithms, the actual "detection" zone will more or less have a quadrilateral (trapeze) shape for its effective area like wireless zone 80 shown in FIG. 1. The radiation that goes over the strictly defined area is likely to be very low in power in a way that it is very difficult to pick up any signal with a smartphone.

Figure 4:
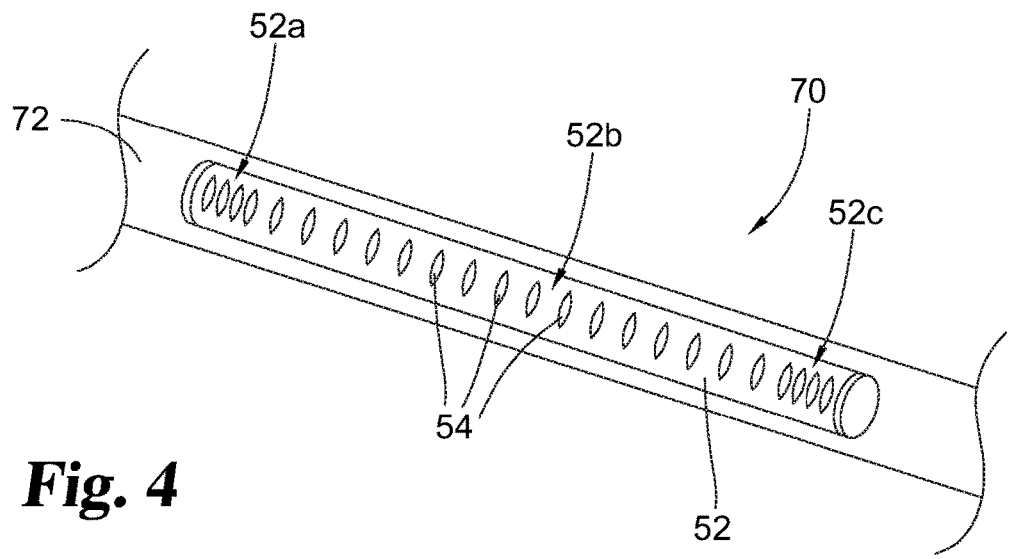
FIG. 4 is a detailed view showing a leaky feeder utilized in the embodiment of FIG. 3.

As shown in FIG. 3 and in detail in FIG. 4, in this embodiment the leaky feeder 52 is mounted to the front vertical surface of desk 70. In a further form, the leaky feeder 52 may be inset slightly or completely within the front face 72 of table 70. Leaky feeder 52 is shown without its optional external covering or sheath in FIG. 4 for purposes of illustration of its internal functional structure. In the form illustrated, leaky feeder 52 may be an adaptation of a standard round coaxial feeder cable where the outer conductor intentionally includes one or more gaps or slots or cut holes (collectively "gaps") 54 which allow the structure to radiate, as further described above. The presence of dielectric material in front of the leaky feeder antenna such as a melamine layer or plastic protection minimally affects the radiation pattern and thus the antennas can be embedded within the construction of the desks to simplify the installation of the StrictID system.

In one form, the creation of the leaky feeder 52 consists of cutting gaps 54 of the right pitch and width to create the intended radiation pattern. In the illustrated embodiment, the gaps 54 are created on only one side of leaky feeder 52 so as to create a directional antenna. In one form, the pattern of gaps 54 in the leaky feeder varies along its length. In another form, the pattern of gaps 54 in the leaky feeder is different at ends 52*a* and 52*c* of the leaky feeder 52 than it is at the center of leaky feeder 52, with this different pattern designed to create destructive interference in those areas and thus the sharp cut off desired for strictly defining wireless zone 80 and angles between boundaries 80*a-d* (specifically for boundaries 80*a* and 80*c* shown in FIG. 3). The pattern may include at least the size, shape, spacing and/or orientation of the gaps 54. In one form, the leaky feeder 52 is created by placing additional shielding over a conventional leaky feeder. Generally, a single array of 3 to 4 slots provided a good antenna beam with the slot pitch and length having an effect on the antenna efficiency or symmetry of the antenna beam. Anyone skilled in the art of making antennas will understand that the method presented here of machining slots in the coaxial cable to make the antenna can be optimized to manipulate the beam pattern without changing the main objectives that are the creation of a precise radiation lobe defining the strict identification location zone (equal power zone) 80 in front of the antenna. Other coaxial cables structures or waveguides may be used to create the antenna provided that the main concept of this invention is retained, that is to be of low radiation efficiency and shape a defined zone of the antenna with a very low radiated power.

Alternatively, the leaky feeder 52 may be specifically manufactured as a custom leaky feeder having gaps of the desired size and orientation in the desired location along its length. In addition, the transmission power applied to the leaky feeder 52 may be modulated so as to achieve the desire radiation depth (and thus define boundary 80*b* shown in FIG. 3). The leaky feeder 52 may be manufactured from a coaxial cable having a round shape, or some other traditional construction or they may alternatively be manufactured from a flat or ribbon type material so as to be more easily and/or discretely mounted to or inset within the desk 70 of FIG. 3 or elsewhere as desired.

The leaky feeder 52 serves to define wireless zone 80 as the area in which a wireless device, such as wireless device 22 or user phone 24, will detect a received signal strength indicator (RSSI) above a predetermined threshold. The wireless zone 50 is defined by the orientation of the leaky feeder 52, the pattern of gaps 54 and the resulting radiation pattern of the leaky feeder 52, the surrounding environment and the transmission power applied to the leaky feeder 52, such as by a transmission source (shown in FIG. 5). The wireless zone 50 shown in FIG. 1 is considered to be "strictly defined" in that it falls off sharply when compared to a traditional wireless signal along at least two sides of its defined area. This is ensured by having a single frontal lobe with monotonically decreasing power with angle and restricting as much as possible the appearance of frontal spurious lobes. The wireless zone 50 shown in FIG. 1 is considered to be "strictly defined" in that it falls off sharply when compared to a traditional wireless signal along at least two sides of its defined area. In one form, a strictly defined wireless zone may include a depth of no more than 5 feet. In a further form, the strictly defined wireless zone may include a depth of no more than 3 feet. In a still further form, the strictly defined wireless zone may include a depth of no more than 1 foot. Alternatively or additionally, the strictly defined wireless zone may include a width of no more than 5 feet. In a further form, the strictly defined wireless zone may include a width of no more than 3 feet. In a still further form, the strictly defined wireless zone may include a width of no more than 1 foot. In the illustrated embodiment, these sharp boundaries would include the sides 80*a* and 80*c*. It shall be appreciated that leaky feeder 52 may be mounted at other locations within or on desk 70 while still providing the desired definition of wireless zone 80. In a further form, the desk 70 may include a cover so as to aesthetically hide the leaky feeder 52 from view. The optional cover is preferably made from a durable yet sufficiently RF transparent material such as fiber mesh, cloth, plastic or the like. The description does not restrict the mounting options and it is possible to use the legs of the desk to host an antenna provided that they do not interfere with the antenna operation.

Figure 5:
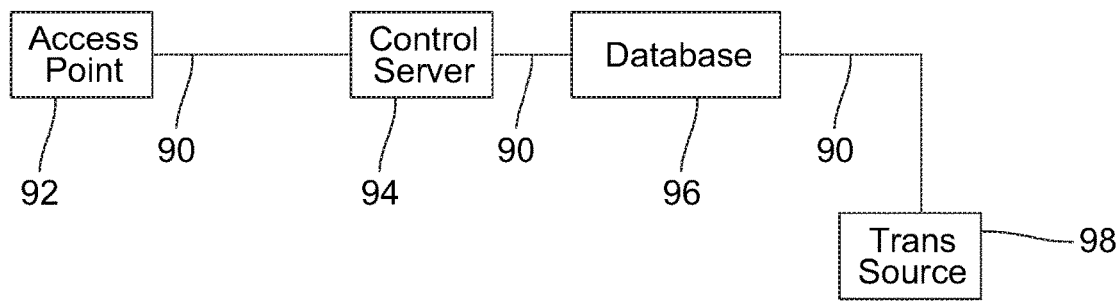
FIG. 5 is a plan view of the proximity detection system of FIG. 3 including other items.
Figure 5:
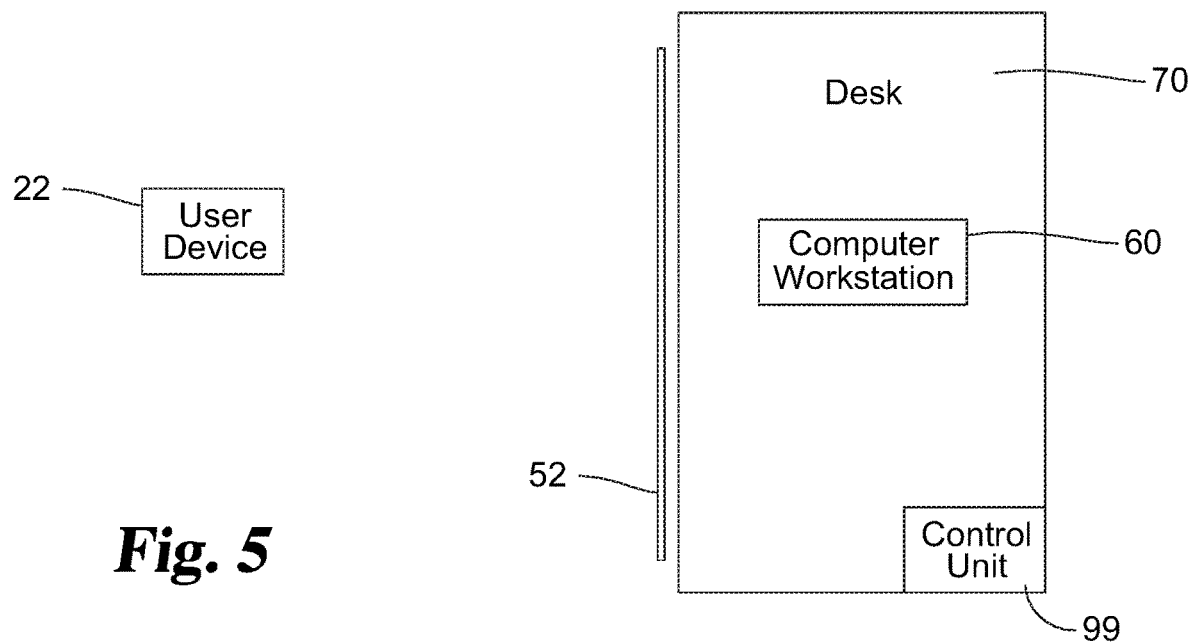

Shown in FIG. 5 is a plan view of the proximity detection system 21 of FIG. 3 which includes other items. Included are wireless device 22, computer workstation 60, desk 70 and leaky feeder 52. Also illustrated are access point 92, control server 94, database 96, transmission source 98 and table control unit 99, two or more of which may be interconnected by network pathway(s) 90. In the illustrated form access point 92 is a wireless access point, such as a wireless router, providing a wireless network with optional mesh capabilities (Bluetooth® or Thread, IEEE 802.15.4) and internet access under the 802.11 standard. This network connection may be utilized by the remaining devices within system 21 to communicate and/or to supplement their own cellular or other communication networks. It shall be appreciated that one or more devices shown in FIG. 5 may be located remotely from each other, such as in an arrangement where control server 94 and/or database 96 are located remotely or operating in the cloud.

In this embodiment, control server 94 operates in conjunction with access node 92 over the internal network to communicate with user device 22 as well as table 70, and its transmission source 98 and control unit 99, in order to carry out the desired method. In one form, when a user device 22 comes within range leaky feeder 52 it has or begins communications with control server 94 to determine its presence (or lack thereof) within wireless zone 80 of FIG. 5. This may be accomplished via the use of a coded signal emitted by the leaky feeder 52 which is then received by the user device 22, as will be described herein. Control server 94 utilizes database 96 for storing records identifying all of the various actions that may be triggered by a user when present within any of a number of defined zones. For instance, control server 94 may store a list of users authorized to utilize computer workstation 60 and/or table 70, as well as their log in information, preferences, and desired table settings (such as height, lighting, etc.). Accordingly, upon determining that user device 22 is within the wireless zone 80, control server 94 may initiate the desired actions. While control server 94 is described and illustrated as being a server, it should be understood that control server 94 may be any computer, including a client server arrangement or a program on a workstation. Server 94 may interface with any of the other components of system 21 by either a wireless or hardwired interconnection. Preferably, the connection is a secured connection. A non-limiting example list of potential interfaces includes IR, optical, RF, serial port, IP network, and USB. Additionally, the functions of control server 94, access node 95 and/or database 96 may be integrated into one computer system or other dedicated hardware.

In addition, in this embodiment, table 70 also includes a transmission source 98 and control unit 99. The transmission source provides a desired signal of the appropriate strength to the leaky feeder 52. Attenuators can be used in series in the RF path to modulate the power getting to the leaky feeder antenna 52 if necessary. In addition, appropriate shielding may be provided, as described with respect to FIG. 1. The settings of the transmission source 98 may be communicated to it by control server 94, via either a wireless or wired connection. Alternatively, these settings may be hard coded into the transmission source 98. Control unit 99 is a standard control unit for controlling the height and other settings (if any) of a height adjustable table 70, as is known in the art. However, control unit 99 may be enhanced in that it is configured to accept remote commands from control server 94, either by wireless or wired connection, so as to enable control server 94 to adjust the settings of the table dynamically based upon the detection of an identified user within the wireless zone 80 and that user's pre-selected preferences.

Figure 6:
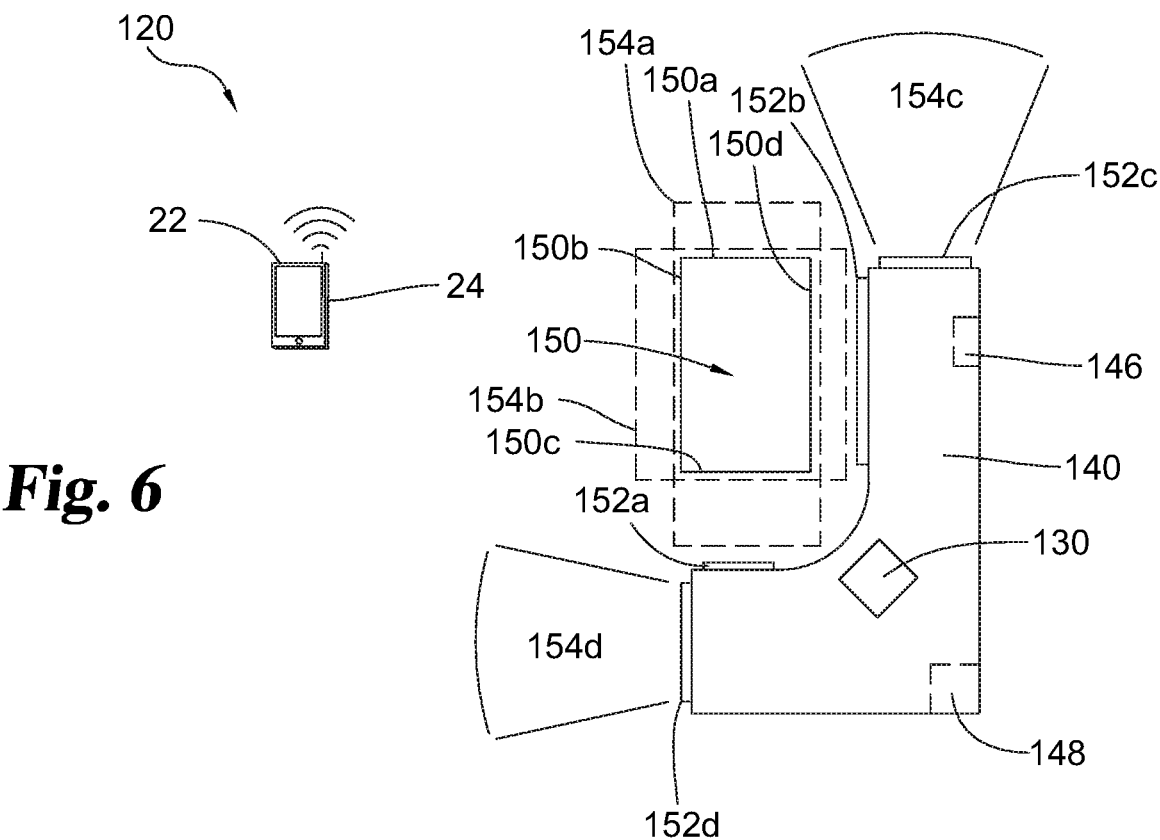
FIG. 6 is a diagrammatic view of a proximity detection system according to another specific application of an embodiment of a proximity detection system according to the present invention.

Turning to FIG. 6, yet another embodiment of proximity detection system including a plurality of leaky feeders 152a-d in order to collectively and more precisely define a wireless zone 150 is illustrated. FIG. 6 shows another proximity detection system 120 in shown which enables a user (such as an employee) using his/her wireless device 122 to have one or more desirable actions taken on the user's behalf, such as automatically logging the user into a computer workstation 130 (or have one or more steps thereto performed), adjusting the height of desk 140 and/or automatically performing one or more other desirable actions by simply entering a strictly defined wireless zone 150. In this embodiment, computer workstation 130 rests on a desk 140 which is in the shape of an "L". Many of the other devices are similar to that described with respect to FIGS. 3-5, however the system 120 utilizes two or more leaky feeders 152a and 152b in order to more strictly define wireless zone 150, which is again defined in proximity of the desk 140, in the area where a worker or employee would sit or stand to utilize computer workstation 130. Specifically, in this embodiment, leaky feeders 152a and 152b define their own wireless zones 154a and 154b respectively. However, by requiring presence in both of these wireless zones 154a and 154b, system 120 is able to define strict wireless zone 150 which is defined as the intersection of wireless zones 154a and 154b. Wireless zone 150 is bounded by logical boundaries 150a, 150b, 150c and 150d, however, in one form each of those boundaries is now influenced by one end of a leaky feeder and its associated sharp signal drop off attributable to destructive interference. For example, in one form leaky feeder 152a is given a greater weight in the definition of boundaries 150b and 150d, while leaky feeder 152b is given a greater weight in the definition of boundaries 150a and 150c. This provides for a sharper cut off than merely utilizing the transmission power provided to the other leaky feeder to regulate this dimension of the wireless zone 50. It shall be appreciated that more than two leaky feeders may be utilized to further define a wireless zone, including the use of a leaky feeder facing upward or downward to provide a strict three dimensional definition of wireless zone 50. Moreover, leaky feeders 152c and 152d may be utilized to define negative wireless zones 154c and 154d which define areas which would block a determination that the wireless device is within wireless zone 150. These negative zones may be utilized to provide increased accuracy, to prevent false positives or to overcome issues raised by the specific environment in which the system 120 is implemented. In another form, the one or more additional leaky feeders may be oriented on the back of desk 140, such as in a 180 degree opposite direction of leaky feeder 152a and/or 152b, so that they can be used comparatively to prevent false positives resulting from issues with back lobes, reflectivity or the like.

Figure 7:
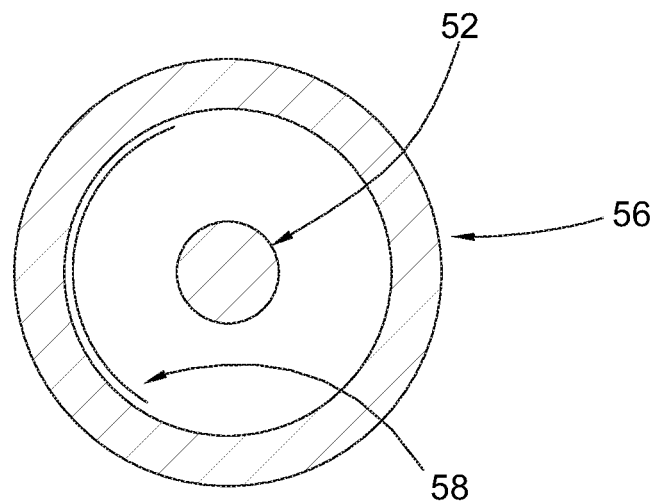
FIG. 7 is a cross-section view of the structure of one embodiment of an antenna for use in the proximity detection system highlighting the use of a back reflector to improve the front-to-back ratio.

As is shown in FIG. 2B, the leaky feeder 52 typically has a back lobe 44 which in some applications like back-to-back countertops installations increases the possibility of false detections due to one antenna receiving signal from the back side. In some embodiments, as shown in FIG. 7, the leaky feeder 52 may be protected by an outer shell 56 made of RF transparent material, typically ABS or PVC. The insertion of a small foil 58 or some other RF blocking/reflecting material inside the PVC tube at a constant distance from the leaky feeder 52 away from the radiating slots improved the front-to-back ratio significantly. FIG. 7 shows a cross-section of the resulting structure according to this further embodiment when the leaky feeder 52 is inside a protective sleeve 56 and includes an RF blocking and/or reflecting back portion 58. This reflector addition can be achieved with adhesive backed aluminum tape or copper tape with little change to the desired performance of the antenna. At the operating frequencies, the skin depth is small, thus other flexible materials capable of being metallized and applied in the back side of the leaky feeder 52 would also improve the front to back ratio.

In an embodiment, the use of highly effective EMI shielding material comprised of metalized polyamide, for example, can create a boundary condition that when such a sheet placed at some short distance off the back of the leaky feeder antenna (but still in the near field region) and inside the StrictID system significantly decreases the back lobe (by 10 dB or more) thus reducing the back lobes which are an unavoidable due to the physics. The use of this shielding material assists in reducing the back lobes to some extent.

In other instances, such as highly dense venues where multiple users can queue, the use of RF absorbent fabric usually made of a polyester base with a few silver-plated copper threads or conductive carbon threads, the use of a small curtain will add the necessary attenuation between closely spaced service desks to eliminate possible cross talk between waiting queues.

Figure 8:
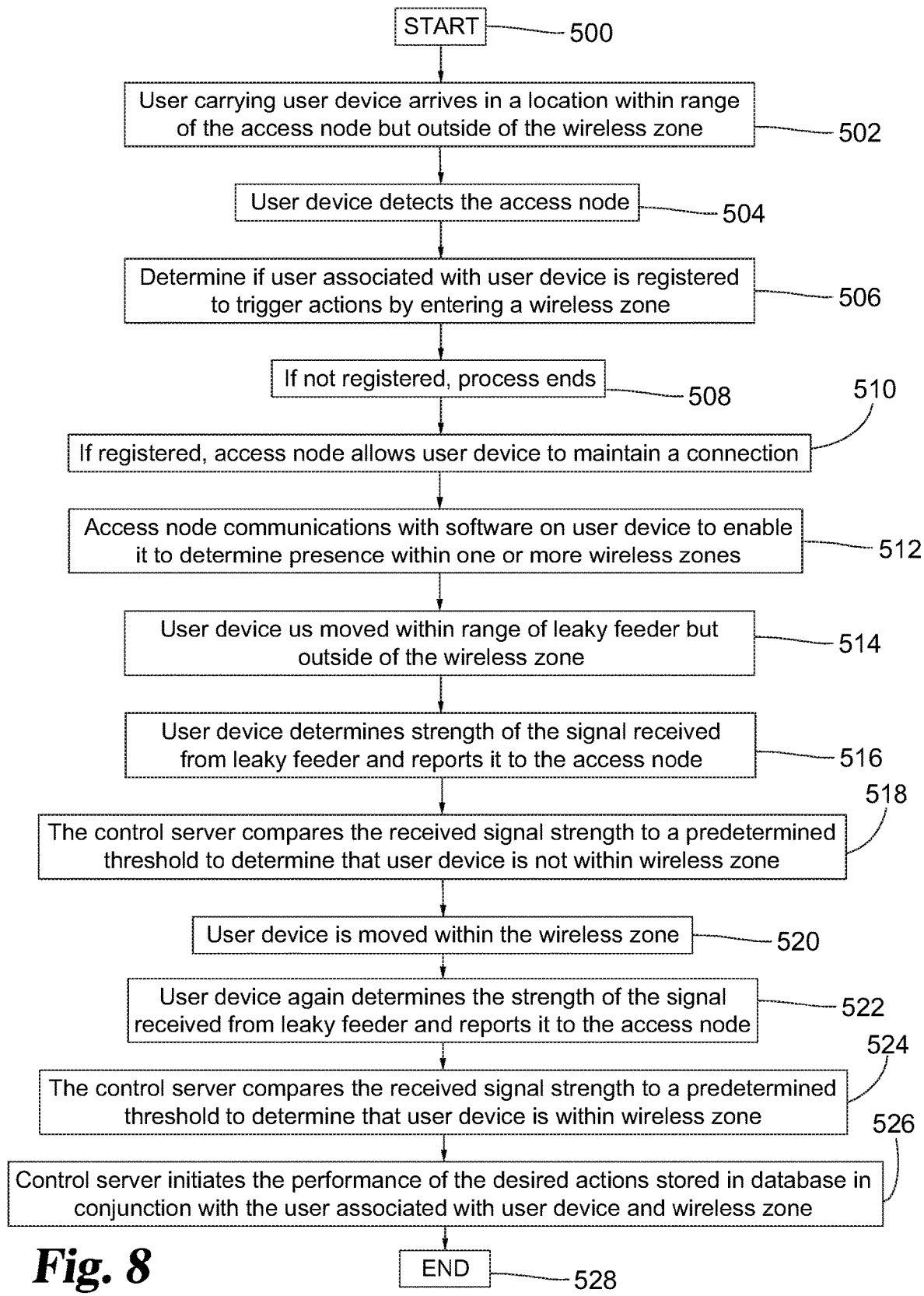
FIG. 8 is a process flow diagram illustrating one set of steps performed in triggering a desired action based upon a user's detected presence within a wireless zone using a wireless device and the novel proximity detection system of FIGS. 3, 4 and 5.

A flowchart illustrating one set of steps performed in configuring a user device 24 for use with a proximity detection system 21 according to one embodiment of the present invention is shown in FIG. 8. The process involves a wireless token 24 and the various other components of access system 21. The following description is with continuing reference to access system 21 of FIGS. 3-5. It shall be appreciated that initial registration and configuration information must be populated within database 96 (or control server 94) to enable to methods described herein to be performed. For example, confirmation information stored by control server 94 within database 96 preferably identifies each wireless zone 80 and any associated actions or related devices (such as computer workstation 60 and desk 70 in the case of wireless zone 80). Other information stored by database 96 includes a unique identification for the computer workstation 60, an identifier of table 70 and a communication address for its control unit 99 as well as the user and his/her associated user device 22 (such as by MAC address, EIN or the like). Various security measures may also be are implemented to secure this information.

Other information included within database 96 are the user's desired actions for each of one or more wireless zones, such as wireless zone 80, and preferences associated with each of those actions. For example, a user may be associated with a user device 22. That user may also have his/her log-in information for computer 60 stored within database 96. That user may also have preference information stored for the preferred height of desk 70 within the range of heights available. When desk 70 is so equipped, preference information regarding the lighting (including on/off, color temperature, brightness) etc. may be included. In the preferred form, this information is received by control server 94 as a result of an initial configuration of the owner/operator of the equipment and the users enabled to access it.

As shown in FIG. 8, the process begins at start point 800 with the user along with the user device 22 arriving in a location within range of an access node 92 but outside of the wireless zone 80 (step 802). In step 804, user device 22 detects the access node 92. Upon this detection, the access node determines whether or not the user is registered and/or authorized to trigger desired actions upon detection in one or more of the wireless zones 80 (step 806). If the user device 22 does not match an entry in the database 96, the process ends at point 808. If the user device 22 is authorized, access node 92 will allow the user device 22 to maintain a connection (step 810). In step 812, access node 92 communicates with software on user device 22 to enable user device 22 to identify signals from leaky feeder 52. In step 814, user device 22 is moved within range of leaky feeder 52, but remains outside of wireless zone 80. In response to the signals received from leaky feeder 52, user device determines the strength of the signal and reports it to the access node 92 (step 816). Using a predetermined signal strength threshold, control server 94 determines that user device 22 is not within wireless zone 80 (step 818). No further action is taken as the condition precedent of presence in the wireless zone is not met. In step 820, the user device 22 is moved into the wireless zone 80. User device 22 again receives signals from the leaky feeder 52 and in response it again determines the strength of the signal and reports it to the access node 92 (step 822). Using a predetermined signal strength threshold, control server 94 determines that user device 22 is within wireless zone 80 (step 824). Given the satisfaction of the condition precedent, control server 94 initiates the performance of the desired actions stored in database 96 in conjunction with the user associated with user device 22 and wireless zone 80 (step 826). In this case, by way of example, that may be to automatically log the user into computer workstation 60 and adjust the height of desk 70 to setting "6". In one further form, the control server 94 may communicate its determination that user device 22 is within wireless zone 80 back to user device 22, and may enable a graphical presentation on user device 22 to enable the user to affirmatively select which, if any, of the desired action stored by database 96 that it would otherwise automatically trigger. In an alternate form, the control server 94 may consider the current occupancy of the wireless zone 80 when performing the evaluation of step 822. For example, if a user is already within the zone and logged in and a second user stops by to visit, in order to prevent a different action from occurring, the system 21 may require the vacation of the zone by the first user before recognizing a second user or the system 21 may require approval of one of both of the user's via their user device's prior to taking an action in such a situation. In another form, the control server 94 may require the presence of any user within the wireless zone for a set period of time before taking step 826, so as to prevent false positives. The process ends at end point 828.

It shall be appreciated that many of the steps described herein shall similarly be usable or adaptable for use with the proximity detection system 120 of FIG. 6. In such instance, steps 816 and 818 and steps 822 and 824 would each require a two-step process in order to ensure that the user device 22 is within each of the zones 154a and 154b defined by leaky feeders 152a and 152a to confirm the user devices presence within wireless zone 150. A failure of either of these zones 154a or 154b would result in a determination that the wireless device 22 is not within the wireless zone 150. In a further form where negative zones are defined (such as zones 154c and 154d of FIG. 6), a similar step would need to be implemented in order to ensure that wireless device 22 is not determined to be within one of those zones prior to proceeding.

It shall be appreciated that other devices and/or environments, such as access control, vending machines, conference rooms, thermostats, lamps, televisions, kiosks, automated teller machines, check-out terminals, gas pumps, car washes, workout stations/equipment, fast-food drive-thru, automobiles, ticketing and many others may benefit from the application of the present invention. Examples may include having the system trigger certain of these steps automatically, such as attendance registration, channel selection, order placement, display of favorite options or other customizations or preferences applied thereto.

Figure 9:
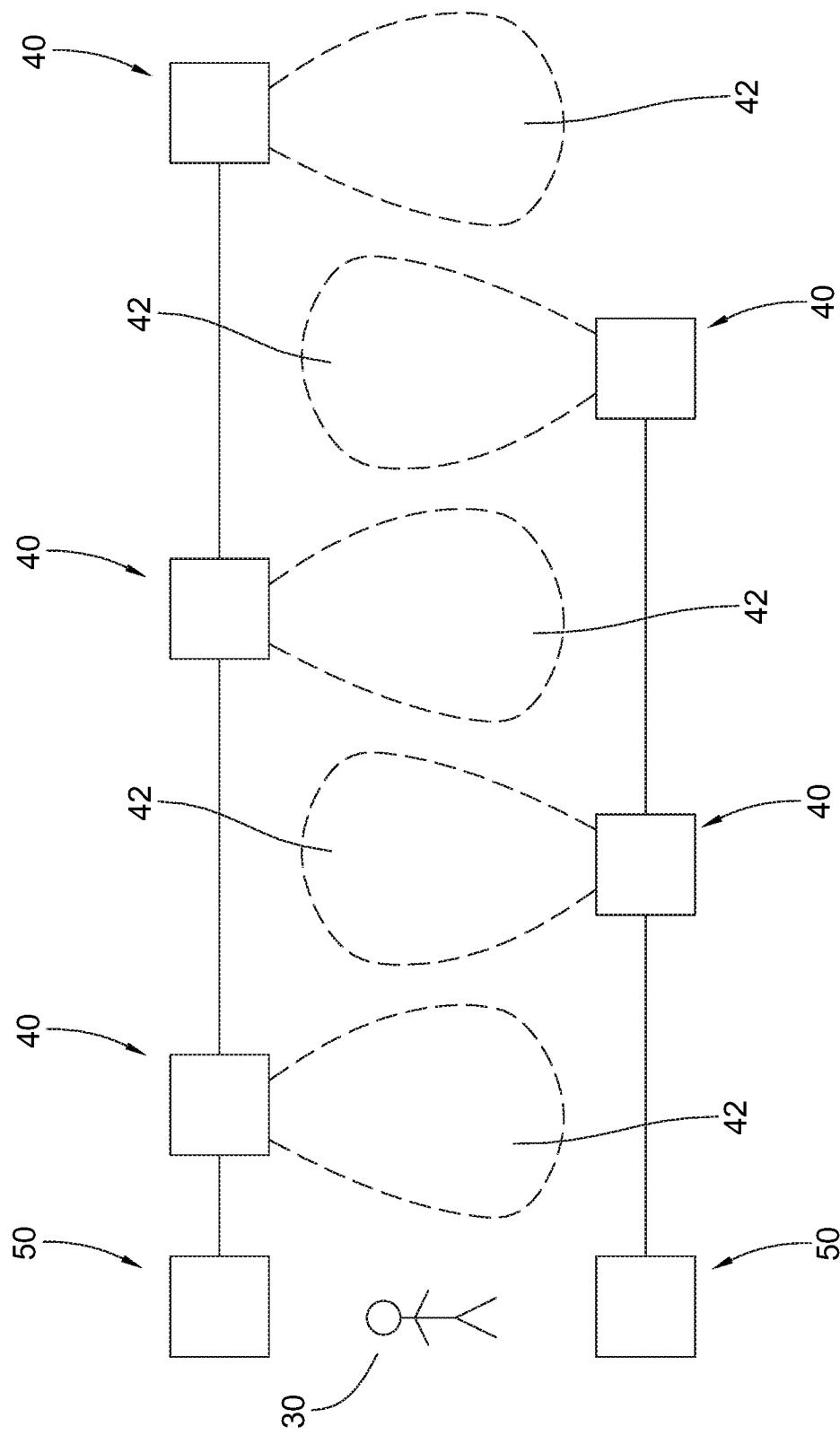
FIG. 9 is a diagrammatic top-down view of a compact and integrated proximity detection system incorporating a planar antenna according to yet another implementation of the present invention.

The use of multiple daisy chained antennas or leaky feeders 52 is also possible to extend the detection locations of the users within the same radio subsystem. Since most of the input power passes through the coaxial line without much loss (only cable losses and some small portion of radiation loss), the system can be extended with regular coaxial cables and terminated at the end of the chain. This topology of multi-zone identification can be used to track people as they advance in long linear queues, such as waiting for an attraction in a theme park, waiting to board an airplane or waiting to order at a coffee shop, as just a few representative examples. Using multiple radio systems 50 and antennas 40 to form multiple chains with non-overlapping beams (or not depending on the application) can help track users 30 of the system in longer queues as shown in FIG. 9.

Alternative antenna designs may also be utilized in place of or in conjunction with the leaky feeder antenna 52 of FIGS. 2-7 and to achieve a similar radiation pattern(s) to that desired and described herein above. The use of machined coaxial cables to build antennas provides great results and could be used in production in certain circumstances. However, to optimize the fabrication cost and aesthetics appeal and reduce the space requirements, the leaky feeder antennas 52 described thus far may also be converted to a planar structure while preserving the desired beam pattern and retain the low radiation efficiency characteristics of the coaxial solution.

Figure 10:
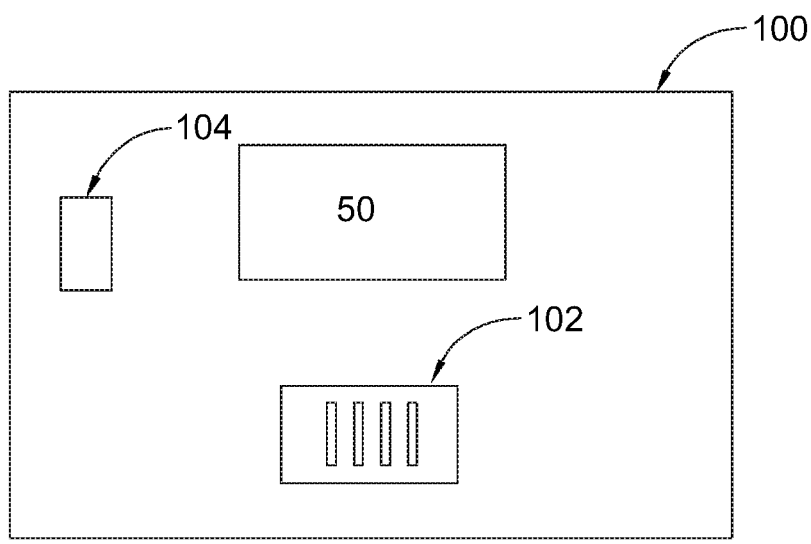
FIG. 10 is a diagrammatic view of a compact and integrated StrictID system incorporating a planar antenna according to another implementation of the present invention.

FIG. 10 illustrates the topology and design elements of an alternative compact and integrated antenna design 100 which is operable as a leaky feeder. The overall planar StrictID circuit and antenna integration 100 includes the same radio subsystem 50 as in the prior embodiments, but the cylindrical leaky feeder antenna 52 has a planar structure 102.

The planar embodiment shown in FIG. 10 may include a secondary conventional high-efficiency antenna 104 (ceramic, PIFA, dipole or similar) that is internally multiplexed with the leaky antenna 102 to allow multiple StrictID to operate as a cluster via mesh or star networking under software control.

Figure 11:
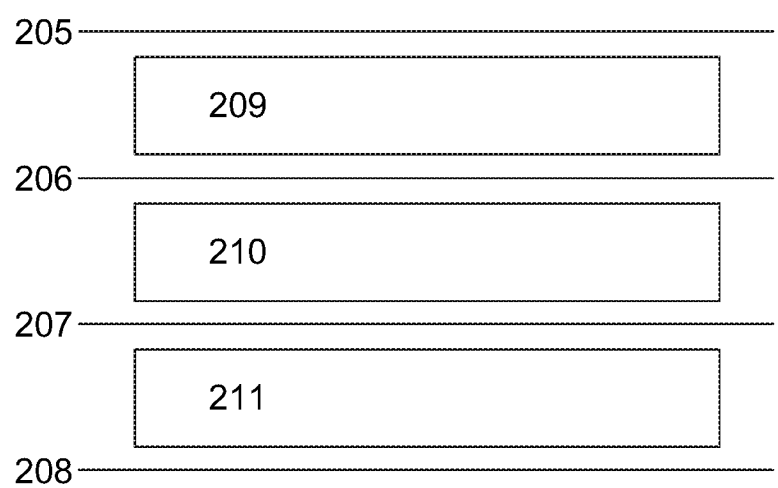
FIG. 11 is a cross section view of the laminated structures of the printed circuit board which comprises the planar antenna of the StrictID system of FIG. 10.

To build the antenna 100 of the planar leaky feeder embodiment, FIG. 11 shows the cross section of laminated structures used to build a common 4 layer printed circuit board with the conductive copper layers being 205-208 and the dielectric layers being 209-211. The intent is to use conventional FR-4 PCB substrate laminations including core dielectric and prepregs to realize the leaky antenna. It is possible to use RF dielectrics such as Rogers RO4350 or any similar high-performance dielectric material to construct the antenna structure, but the overall goal being to create a low-cost solution, conventional printed circuit board manufacturing techniques to incorporate both the radio circuitry and the antenna in a compact, low-cost and efficient to manufacture unit is likely to be preferred.

Figure 12:
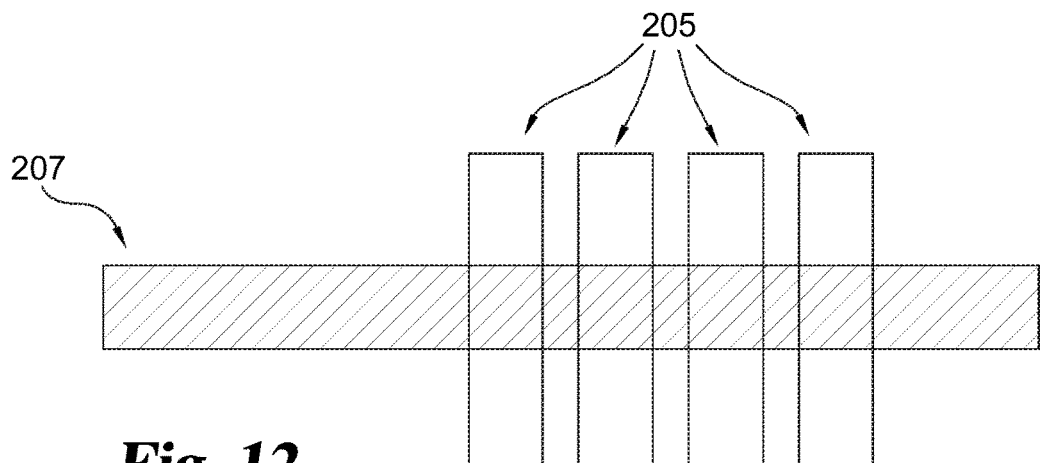
FIG. 12 is a plan view of the radiation slots in the planar antenna of FIG. 10.

The dielectric stack of FIG. 11 can be arranged to create a well-known topology called an asymmetric stripline, as is shown in FIG. 12. The top 205 and bottom 208 copper structures of the 4-layer PCB will generally be used as the top and bottom shielding layers. Within the antenna structure, layer 207 will be removed leaving only 209 and 210-211 dielectric layers. The feed trace of the antenna will be constructed by the 206 copper layer. For 1.5 mm FR-4 PCB the typical antenna feed line will be around 370 um of width to obtain a 50 ohm characteristic impedance and will thus allow normal PCB fabrication techniques and processes to be used. The ideal construction would be a 3 layer PCB with the antenna feed right in the middle, but this is not a common PCB stack configuration on the market so generally a 4-layer solution is preferred. The feed line connects the shielded radio circuit 50 and the antenna 102 over a short distance that is shielded by the copper layers 205 and 208.

Figure 13:
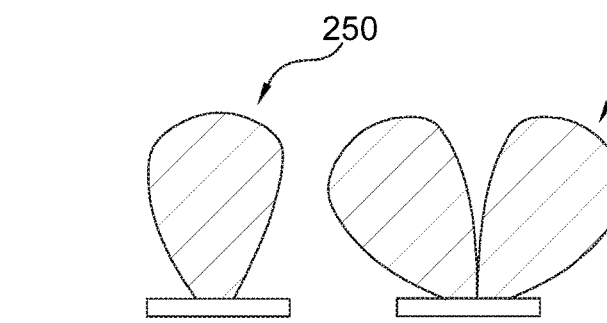
FIG. 13 shows two radiation patterns obtained with an antenna size varying between 60 mm in width and 100 mm in width.

In the antenna radiation zone 102 the series of copper opening slots 205 (4 small slots is a good solution, but more or less slots can be created to modify the intended beam pattern) allow the RF energy to escape in a directed beam only at that point. Note that the overall circuit 100 size is important for the creation of a controlled radiation lobe. FIG. 13 shows two possible and useful radiation patterns (250 and 255) obtained with an antenna size (determined by the width of the back copper plane) varying between 60 mm in width and 100 mm in width obtained through manipulation of the number of slots and slot spacing. Similar to the leaky feeder 52 there is a fair amount of design space options possible to create a tuned pattern for a given application.

It is also possible to combine multiple antennas 102 on a common circuit 100 to create an enhanced and more accurate inside/outside detection of the user by combining the radiation pattern 250 and 255 in one single unit with multiplexed antennas. The multiplexing is usually controlled by software and can thus be made very quickly to change between antennas and based on the response from the user cell phone 22 interactions allow the user to be precisely located as shown in the hatched zone 256 of FIG. 8.

Figure 14:
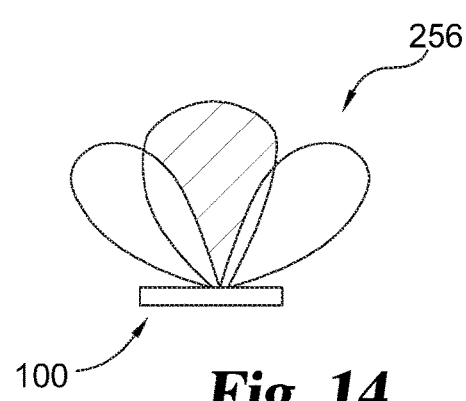
FIG. 14 is a plan view showing the use of two multiplexed antennas in one application of the StrictID system to achieve a desired zone.

Note than in FIGS. 13 and 14 the view is from above the zone and the circuit 100 is seen from the side as if looking above the system. The radiation pattern is of equivalent signal intensity and does not reflect the radio range at scale. The complete circuit will generally measure approximately 60 mm-100 mm in width for operation in the 2.4 GHz ISM radio band and the radio range for a −90 dBm signal level will generally be adjusted to be around 1 meter through changes to the parameters of the transceiver power settings.

It should be noted that variants of higher layer count PCB structures or a lower count 2 layer PCB with soldered shield could be created to effectively create the same antenna structure as can be derived by anyone skilled in the art of creating low-cost PCBs. One could also construct the system of FIG. 10 by soldering a separately built leaky slotted planar antenna on a circuit substrate 100 without changing the intent of the invention.

In a still further form, multiple StrictID components may be linked together with their secondary antenna 104 allowing multiple combinations of inside/outside detection and rejection based on the Boolean combination of antenna pattern and detection of the user's smartphone 22 in those zones. Those Boolean operations are likely to be realized on the server side as it simplifies the deployment of the StrictID system.

The applications for a StrictID system with a well-defined RF identification area are numerous. In their simplest form of a single StrictID assembly, a user enters the identification zone, for example in the ordering zone of a coffee shop. A connected terminal may rapidly identify the user and propose commonly purchased items and the preferred customer choices. The use of the StrictID system and its very limited connection zone will ensure that only one or at most 2 or 3 registered users can be detected in the small area near the ordering zone and the clerk serving the customer will have no difficulty identifying the person with a second factor such as mentioning the name or with a picture on file. For example, In addition to the user identification and/or authentication functions described herein, the system may also include a secondary user verification step. For example, an application on the user's smartphone 22 may collect biometric identifying information, such as by the use of Apple's Touch ID® or Face ID® systems for use within the StrictID system. Alternatively, other biometric sensors or cameras may be present within or proximate to the defined zone in order to secondarily authenticate that the registered owner of the detected mobile device is indeed present and that the mobile device has not been compromised. For example, transactions exceeding a set threshold, such as $50, may require this secondary verification.

A similar process can happen with another StrictID element located near the point of sale terminal to allow rapid self-checkout of the purchase (e.g. the coffee) and the user will simply have to stand in the StrictID RF illuminated area for a few seconds for the identification process to complete. Multiple similar small transactions scenarios where the user may have his hands full or would not want to remove e.g. his gloves to use the telephone to perform identification transactions.

Another use of those distributed and narrow beam antennas would be in car drive-through scenarios. By allowing the beams to enter the cars only in a defined zone (e.g. when the user is aligned with the ordering booth), the system will allow the identification process with the smartphone to be completed without the user having to get his phone outside the window of the card. In most smartphone RFID solutions relying on near-field communication, the distance to the telephone must be very short due to the physics and require the user to almost touch his smartphone to the reader. In cold locations, or to improve user experience the use of the added RF range offered by the StrictID approach will bring benefits.

The planar improvement benefits to the StrictID systems are further evident when one considers the integration of the authentication mechanisms in door frames, door panels or similar structures where the cylindrical nature of the leaky feeder 52 it not as easily adaptable. The ability to combine two antenna functions like the global antenna 104 and the local radiation pattern antenna 102 allows those variants of StrictID to detect the approach of a person like common far reaching RF identification solutions based on Bluetooth Low Energy and when the users reaches very close to the door, antenna 102 can ensure that the user is really close to finalize the unlocking of the door by way of another factor like a capacitive touch handle or similar.

The set of steps performed in configuring a user device 24 for use with a proximity detection system 20 in FIG. 5. Could be applied to any of the other embodiments described in FIGS. 6 and/or 13.

Figure 15:
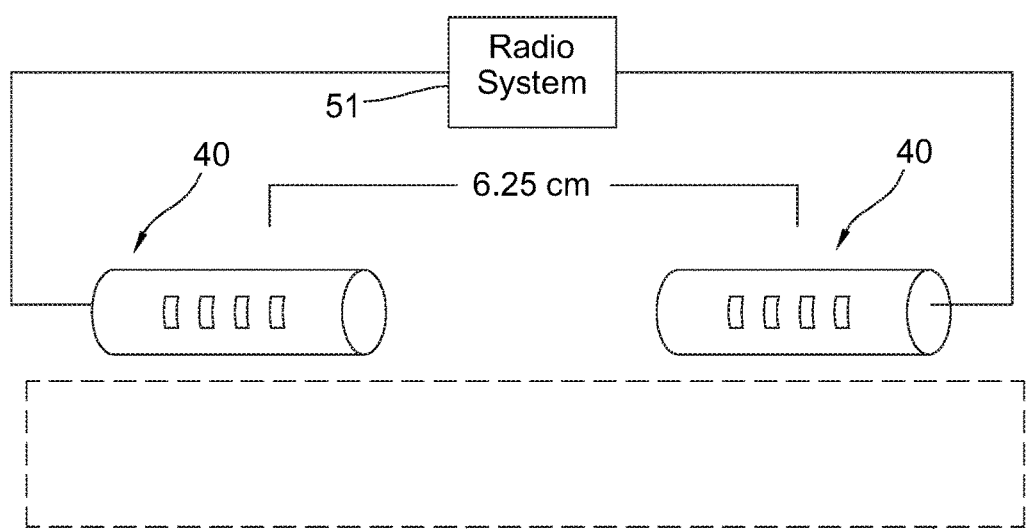
FIG. 15 is a plan view showing the use of two offset antennas in one application of a proximity detection system according to the present invention system to determine an angle and/or arrival or angle of departure while maintaining strict control of the radiation zone.

In one further form, shown in FIG. 15, multiple antennas 40 may be utilized in a selective spatial arrangement to allow for the determination of an angle of arrival and/or angle of departure for a user, such as the user's arrival within a strictly defined zone 81. In the illustrated embodiment, the antennas 40 are offset from one another by approximately ½ of a wavelength of the signal utilized. In the case of Bluetooth Low Energy, which has a wavelength of approximately 12.5 centimeters, this offset would be roughly 6.25 centimeters (or 2.5 inches). Using this configuration, the radio system 51, which is operatively coupled to each of antennas 40 and is able to measure the phase difference in the inbound signal within the radio and may perform an angle of arrival or angle of departure calculation as described in the Bluetooth Core Specification Version 5.1, Vol. 1, Part A, pgs. 281-284. The resulting angle of arrival or angle of departure may be utilized in certain applications to ensure that a detected user came from the expected direction, such as in the case of a queue, or that a previously detected user has departed in the expected direction, such as when boarding a plane. Using this information may further assist an embodiment of the present invention in detecting and eliminating false positives or to enhance security, determine user order in queues while not having a dependency on only the radio strength signal which can vary between users due to attenuation, orientation and obstacles.

Persons familiar with the field of radio technology and latest advances in digital RF processing will understand that using soft-defined radios with synchronized ADCs working with digital I/Q demodulators will be able to determine the angle of arrival of signals using phase offset calculations when receiving the packets. While the StrictID system could draw major cost benefits from the use of low-cost implementation in chipsets implementing Bluetooth Core Specifications Version 5.1, soft-defined radio derivatives of the same idea or ones that can leverage multi-input multi-output (MIMO) receivers are also usable in the solution The invention can leverage considerable benefits even with improvements to user location based on angle of arrival due to the physical proximity required to be authenticated.

The StrictID solution ensures that the corresponding noise floor and the Bluetooth radios sensitivity make long-range or multipath detection much less likely to happen. The manufacturing process of leaky feeders, notably on planar substrates can be well controlled, is mechanically simple and tolerant to manufacturing variations. Furthermore, the use of multiple planar leaky feeders will still maintain the control on the radiation pattern.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected. Hence, the proper scope of the present invention should be determined only by the broadest interpretation of the appended claims so as to encompass all such modifications as well as all relationships equivalent to those illustrated in the drawings and described in the specification.

What is claimed is:

1. A method for detecting the presence of a wireless user device within a strict wireless zone and subsequently triggering a desired action, the method comprising the steps of:
    maintaining a database storing identifying information for at least one wireless user device in association with instructions for initiating a desired action upon detecting that the wireless user device enters the strict wireless zone;
    establishing the strict wireless zone using a set of one or more leaky feeder antennas connected to a transmission source; wherein the set of one or more leaky feeders includes a first leaky feeder and a second leaky feeder and the radiation patterns of the set of leaky feeder antennas defines the strict wireless zone;
    determining with a processor whether the wireless user device is within the strict wireless zone based upon the strength of a signal received by the wireless device from the set of one or more leaky feeders or received by the set of one or more leaky feeders from the wireless device;
    determining with a second processor the angle of approach or angle of departure of the wireless user device into the strict wireless zone based upon a first and a second signal wherein the first signal is received by the wireless device from the first leaky feeders or received by first leaky feeder from the wireless device and the second signal is received by the wireless device from the second leaky feeder or received by second leaky feeder from the wireless device; and
    triggering the desired action based upon a determination by the processor that the wireless user device is within the strict wireless zone.

2. The method of claim 1, wherein at least one leaky feeder antenna within the set of one or more leaky feeder antennas has a planar structure.

3. The presence detection system of claim 1, wherein the first and the second leaky feeder within the set of one or more leaky feeder antennas are separated on center by ½ of the length of an operational wavelength of the transmission source.

4. The method of claim 3, wherein at least one leaky feeder antenna within the set of one or more leaky feeder antennas has a planar structure.

* * * * *